United States Patent [19]
Nakano et al.

[11] Patent Number: 5,664,982
[45] Date of Patent: Sep. 9, 1997

[54] MANUFACTURING METHOD FOR A LIQUID CRYSTAL DISPLAY

[75] Inventors: Shigeki Nakano, Kajikawa-mura; Kenji Takano, Toyosaka; Akira Awaji, Toyoura-machi; Takeshi Masuyama, Takatsuki, all of Japan

[73] Assignee: Shipley Company, L.L.C., Marlborough, Mass.

[21] Appl. No.: 544,145

[22] Filed: Oct. 17, 1995

[30] Foreign Application Priority Data

Oct. 18, 1994 [JP] Japan .................. 6-252285

[51] Int. Cl.$^6$ .................. C09K 19/00; H01J 9/14
[52] U.S. Cl. .................. 445/24; 430/20; 430/319; 216/5
[58] Field of Search .................. 445/24, 52; 216/5; 430/319, 20

[56] References Cited

U.S. PATENT DOCUMENTS 4,670,097  6/1987  Abdalla et al. .................. 445/24
5,507,404  4/1996  Ryu .................. 216/5

FOREIGN PATENT DOCUMENTS 62-135809  6/1987  Japan .................. 430/20

*Primary Examiner*—P. Austin Bradley
*Assistant Examiner*—Jeffrey T. Knapp
*Attorney, Agent, or Firm*—Robert L. Goldberg

[57] ABSTRACT

A method for manufacturing a color liquid crystal display device is available where light-blocking layers are provided for the color filter stripes on a pixel-by-pixel basis by inserting the light-blocking layers between stripes of transparent conductive films that are already striped as scanning electrodes. The manufacturing method is characterized by the steps of the formation of a transparent conductive film on a first transparent substrate, patterning of the transparent conductive film by coating the transparent conductive film with a colored, positive resist, exposure and development, coating of patterned transparent conductive films with a blackened, negative resist, formation of black stripes of the negative resist between the patterned transparent conductive films by performing back exposure through the first transparent substrate and development, and the removing the positive resist remaining on the patterned transparent conductive films.

3 Claims, 2 Drawing Sheets

MANUFACTURING METHOD FOR A LIQUID CRYSTAL DISPLAY

FIELD OF THE INVENTION

The present invention relates to a method of manufacturing a simple matrix color liquid crystal display device, or, more specifically, the light-blocking layers to be formed between pixels.

PRIOR ART

In simple matrix liquid crystal display devices, a color display is enabled by using TN and STN liquid crystals. In either case, transparent electrodes are formed on both transparent substrates in order to form a stripe and to extend perendicularly in relation to each other with a liquid crystal interposed in between them. By applying a signal voltage to the striped electrodes on one substrate and a scanning voltage to the striped electrodes on the other substrate, the liquid crystal portion at a pixel which is supplied with both the signal voltage and the scanning voltage synchronously is actuated for display. Color filters are used for color display. In general, color filters are inserted between the transparent substrate and the transparent electrodes. That is, color filters are formed on a transparent substrate and then transparent electrodes are formed on the color filters. The color filters consist of three sets of stripes (red, green, and blue), and the stripes of the three colors are isolated by black light-blocking layers.

Particularly in the use of an STN liquid crystal, in which case the transparent electrodes must be formed on a perfectly flat surface, a top coat is provided on the color filter layer for the purpose of smoothing it.

In general, there are four color arrangement schemes for color filters: mosaic, stripe, triangle, and four-pixel arrangement. The stripe color arrangement is employed in simple matrix devices using a TN or STN liquid crystal. To realize the effective performance of the hue in the color display and to thereby produce clearer pictures, color arrangement schemes other than stripes, such as mosaic, are preferable because the sharpness of the color edge is enhanced by bordering the respective pixels by light-blocking layers.

The stripe color arrangement can provide sufficient color display for characters and figures. Because it is insufficient in terms of hue and visibility for color picture display, however, the mosaic color arrangement is used for this purpose. To make the picture quality of the strip color arrangement closer to that of the mosaic color arrangement, light-blocking layers may be inserted between the stripes on a pixel-by-pixel basis for sharpening the borders of the respective pixels. In this case, the colors of pixels are arranged in the order of, for instance, red, red, and red, or green, green and green, in contrast to the case of the mosaic color arrangement, in which pixels of red, green, and blue are arranged adjacent to each other with the border formed by black. In spite of the difference in the color arrangement sequence, the display device of the stripe color arrangement with the light-blocking layers can also improve the picture quality over that of the conventional stripe device, because color enhancement by the black bordering for the respective pixels is still effective. In the manufacture of color filters of the stripe color arrangement, however, a number of cumbersome steps is needed to insert light-blocking layers for the respective stripes on a pixel-by-pixel basis. In addition, the light-blocking layers must be positioned precisely in complete alignment with respect to the opposite electrodes, which requires highly accurate steps such as mask positioning.

When light-blocking layers are provided on the substrate that is opposed to the substrate on which the color filters are provided, the manufacturing steps can be much simplified in comparison to the case where light-blocking layers are directly inserted between the color filter stripes. This is because the light-blocking layers can be provided between the stripes of the transparent conductive films which are already striped as the scanning electrodes. Usually, light-blocking layers are formed between the stripes by applying a colored photosensitive resin, performing exposure through a mask and development, and removing the unnecessary portions of the resin. This process is still cumbersome, however, because it necessarily includes mask positioning, which can lead to a lower yield and increase the manufacturing cost.

[Problem to be Solved by the Invention]

As described above, in the conventional manufacturing method involving a color liquid crystal display device the insertion of light-blocking layers for the color filter stripes on a pixel-by-pixel basis requires cumbersome manufacturing steps, even though it presents an advantage in that the picture quality of the color display can be greatly improved from that of the conventional stripe color arrangement.

The present invention has been made to solve the above problems. An object of the invention is, therefore, to provide a simple manufacturing method for a color liquid crystal display device in which light-blocking layers are provided for the color filter stripes on a pixel-by-pixel basis by inserting the light-blocking layers between the stripes of the transparent conductive films that are already striped as the scanning electrodes.

[Means for Solving the Problem]

The invention recited in claim 1 is characterized by comprising the steps of the formation of a transparent conductive film on a first transparent substrate; the patterning of the transparent conductive film by coating the transparent conductive film with a colored, positive resist, and then performing exposure and development; the coating of the patterned transparent conductive films with a blackened, negative resist; the formation of black stripes of the negative resist between the patterned transparent conductive films by performing back exposure through the first transparent substrate and then development; and the removal of the positive resist remaining on the patterned transparent conductive films.

The invention recited in claim 2 is characterized in that the positive resist is not removed immediately after the patterning of the transparent conductive film, but is used to assist in the formation of the black stripes.

The invention recited in claim 3 is characterized in that the positive resist remaining on the patterned transparent conductive films is used as filters for the negative resist in order to prevent portions of the negative resist lying on the positive resist from being optically set by the back exposure.

[Operation]

According to the invention recited in claim 1, first, the positive resist, which is colored in advance, is used as a resist for forming the scanning electrodes. The scanning electrodes are formed by patterning through the exposure, development, and etching. The blackened, negative resist is then applied and subjected to back exposure through the substrate and then development, so that the portions of the resist occupying the spaces between the striped electrodes are set to become light-blocking layers. Then, the positive resist remaining on the electrodes is removed. In this manner, the light-blocking layers can be provided on a pixel-by-pixel basis for the color filter stripes that are needed for color display in a simple matrix liquid crystal display device by a relatively simple process which is free of mask positioning.

According to the invention recited in claim 2, in patterning the scanning electrodes, the positive resist that is to remain on the scanning electrodes is of a type which is not dissolved or removed even if it is subjected to exposure, development, and etching, in order that it can be used in the assistance of the formation of the black stripes. This enables the black stripes to be formed positively between the scanning electrodes without the need for performing any cumbersome steps such as mask positioning.

According to the invention recited in claim 3, during back exposure through the transparent substrate, a sufficient quantity of light does not reach the negative resist on the scanning electrodes, because the colored resist under the negative resist obstructs the light. Therefore, the negative resist is not set sufficiently. By utilizing the difference in solubility between the portions of the negative resist in the development step, only the portions of the negative resist lying on the scanning electrodes can be removed while the light-blocking layers are left between the stripes.

[Embodiment]

FIG. 1(a)–1(g) show the steps of a method for manufacturing a color liquid crystal display device according to the present invention.

First, a glass substrate 1 having a high surface smoothness is prepared, and an ITO film 2 is formed on the glass substrate 1. In this embodiment, a commercially available ITO substrate (i.e., a substrate with an ITO film) having a surface resistivity of 20 Ω/□ was used. The ITO substrate is coated with a colored, positive photosensitive resist 3. The resist 3 is composed so as to have a novolak resin as the main component, and coloring pigments are dissolved or suspended therein. The pigments used in this embodiment are those generally used for blocking light. Pigments or dyes of blue, red, yellow, etc., for example, are combined with, i.e., caused to be included in, carbon black, a black pigment, a black dye, and the like. The composition ratio of the resin components actually sued were as follows:

| | |
|---|---|
| Novolak resist: | 20 parts by weight |
| C.I. pigment black 7: | 4 parts by weight |
| C.I. pigment blue 15.6: | 5 parts by weight |
| C.I. pigment red 177: | 2 parts by weight |
| C.I. pigment yellow 139: | 1 part by weight |

The photosensitive resin composition 3 is applied to the substrate at a thickness of 2.0 μm (FIG. 1(a)). The coated substrate is then subjected to exposure through a mask 4 (FIG. 1(b)). After development, the remaining portions of the resist are thermally set at 130° C. to 170° C. (FIG. 1(c)). If the thermal setting temperature is lower than 130° C., solvents are not evaporated sufficiently, and could possibly cause insufficient setting. If the temperature is higher than 170° C., excessive setting may make the resist difficult to remove. The portions of the ITO film 2 that are not covered with the resist are then removed by etching (FIG. 1(d)). The portions of the ITO film 2 that remain on the substrate, i.e., the portions covered with the resin, thus become scanning electrodes. Then, a blackened, negative photosensitive resin 5 is deposited on the above structure (FIG. 1(e)). Concretely speaking, an acrylic negative resist was used as the main component, and the same coloring pigments as used in the positive resist in the step in FIG. 1(a) were used with the same composition. Specifically, composition was as follows:

| | |
|---|---|
| Methacrylic acid/methyl methacrylate copolymer: | 6 parts by weight |
| Pentaerythritol tetraacrylate: | 4 parts by weight |
| Diethylthioxanthone: | 1.2 parts by weight |
| Michler's ketone: | 1.2 parts by weight |
| 2-(o-chlorophenyl)-4,5-diphenylimidazolyl dimer: | 0.2 parts by weight |
| Ethyl glycol monoethyl acetate: | 20 parts by weight |
| C.I. pigment black 7: | 4 parts by weight |
| C.I. pigment blue 15.6: | 5 parts by weight |
| C.I. pigment red 177: | 2 parts by weight |
| C.I. pigment yellow 139: | 1 part by weight |

The above photosensitive resin composition is applied by spin coating at a coating thickness of 2.0 μm, as measured fro the glass substrate surface. Back exposure is then performed from the glass substrate side (see FIG. 1(f)). The portions of the negative resist that are in direct contact with the glass surface are set receiving the energy of light. The portions of the negative resist that are placed on the positive resist, however, are not set or set insufficiently, since a sufficient quantity of light does not reach the negative resist because of obstruction by the coloring pigments. Therefore, by utilizing a difference in solubility between the portions of the negative resist lying on the scanning electrodes 2 can be removed while only the portions existing between the stripes are left. Then, by removing the positive resist, all of the resist that was placed on the scanning electrodes is now removed, so that a 2.0 μm thick black stripe b serving as light-blocking layers are formed between the scanning electrodes 2 (FIG. 1(g)).

Light-blocking layers b formed between the scanning electrodes 2 are required to have a sufficiently high resistivity. To this end, carbon, a black pigment, etc., which are highly conductive in nature, should be of a type whose conductivity is as low as possible. Alternatively, tow or more types of dyes and pigments having small conductivities may be combined.

The method for manufacturing the scanning-electrode-side substrate of the liquid crystal display device according to the invention has been described above. In this embodiment, the same signal-electrode-side substrate as for the conventional device is used. The signal-electrode-side substrate is therefore manufactured by the same method as the conventional method. Conventionally, color filters are provided on the signal electrode side. Concretely speaking, stripe-shaped color filters are formed on a transparent substrate, and light-blocking layers are inserted between the color filter stripes of red (R), green (G), and blue (B). After a top coat for surface smoothing is formed on the color filters, ITO signal electrodes are formed.

FIG. 2 is a sectional view of a color liquid crystal display panel that has been manufactured by using the scanning-electrode-side substrate produced according to the method of the invention. In practice, it is necessary to form an orientation film on each electrode substrate and to subject the orientation film to orientation treatment. Further, in the case of an STN liquid crystal, a correction cell or a compensation film for color correction is provided on the orientation film. The respective components of the liquid crystal display panel in FIG. 2 will be described below.

Reference numeral 11 denotes a driving cell; 12, a correction cell; 13 and 23, polarizing plates; 14, a correction liquid crystal; 15, a driving liquid crystal; 16, black stripes as light-blocking layers; 17, transparent electrodes as scanning electrodes; 20, transparent electrodes as signal electrodes; 18 and 19, orientation films; 21, a leveling top coat; 22, color filters; and 24, back light.

FIG. 3 shows a color display pattern as seen from the front side of the liquid crystal display device that has been manufactured in the above-described manner. It will be seen that the respective stripes are bordered by the light-blocking layers on a pixel-by-pixel basis, in contrast to the pattern of the color filter stripes of the conventional STN device, the bordering by the light-blocking layers enables the provision of a clearer hue than that obtainable using conventional devices.

As may be understood from the above embodiment, the invention is characterized in that the bordering by the light-blocking layers on a pixel-by-pixel basis as shown in FIG. 3 has been realized by using the scanning-electrode-side substrate which has not contributed to color display conventionally. Usually, to form light-blocking layers between the scanning electrodes, the following steps are needed: formation of scanning electrodes by patterning an ITO film, application of a resist, mask positioning, and patterning. In contrast, according to the present invention, the resist used in forming the scanning electrodes by patterning is not removed, i.e., is left as is, and reused for the formation of the light-blocking layers. To this end, a colored positive resist is used, which is not the case in the conventional methods. Further, back exposure is performed after a negative resist for formation of the light-blocking layers is applied. As a result, while the portions of the negative resist existing between the scanning electrodes are set, the potions of the negative resist placed on the scanning electrodes are not set because the positive resist prevents light from reaching the negative resist. I the next development step, only the portions of the negative resist existing between the scanning electrodes are left, while the portions of the negative resist on the scanning electrodes are removed. Therefore, the light-blocking layers are formed without using any cumbersome steps such as mask positioning.

The present invention is superior to the conventional one in that the positive resist that remains on the scanning electrodes in the development step for forming the scanning electrodes is not removed, but is left until the application of the negative resist for formation of the black stripes, i.e., light-blocking layers. The coating thickness of the negative resist can be adjusted by appropriately setting the thickness of the remaining positive resist.

More specifically, if a thickness necessary for the light-blocking layers is determined in advance by a certain appropriate means such as experimentation a positive resist that is formed at a thickness equal to or a little smaller than the thickness thus determined can be used to assist formation of the black stripes. The amount of coloring pigments to be added to the positive resist may be controlled accordingly. In this manner, the positive resist can be used to control the thickness of the negative resist with high accuracy.

In the above embodiment, the conventional color filters are formed on the signal electrode side by the generally performed method, and the light-blocking layers according to the invention are provided on the side of the scanning electrodes that are opposed to the signal electrodes. The signal electrode side and the scanning electrode side are not absolutely required to have such roles, however. The light-blocking layers according to the invention may be provided on the signal electrode side with the color filters formed on the scanning electrode side. That is, the substrate for formation of the light-blocking layers need not be fixed to the one on the scanning electrode side.

[Advantages of the Invention]

According to the invention recited in claim 1, the light-blocking layers can be provided, on a pixel-by-pixel basis by a relatively simple method, for the color filter stripes for color display in the conventional simple matrix liquid crystal display device. This realizes, at a low cost, a color display that is clear and superior in hue performance to the mosaic device. It can therefore be said that the manufacturing method according to the invention is superior for application in manufacturing a simple matrix color liquid crystal display device.

According to the invention cited in claim 2, in patterning the scanning electrodes, the positive resist that is to remain on the scanning electrodes is of a type which is not dissolved or removed even if it is subjected to exposure, development, and etching, which means that it can be used to assist in the formation of the black stripes. This enables the black stripes to be formed positively between the scanning electrodes without the necessity for performing any cumbersome steps such as mask positioning.

According to the invention cited in claim 3, during back exposure through the transparent substrate, a sufficient quantity of light does not reach the negative resist on the scanning electrodes, because the colored resist under the negative resist obstructs the light. Therefore, the negative resist is not set sufficiently. By utilizing the difference in solubility between the portions of the negative resist in the development step, only the portions of the negative resist lying on the scanning electrodes are removed while the light-blocking layers are left remaining between the stripes.

Figure 1A:
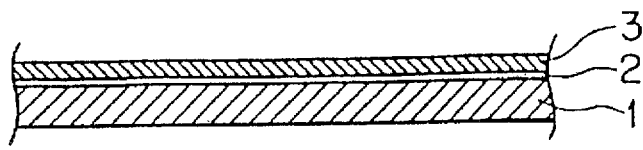
FIG. 1 includes sectional views showing, in sequence, the manufacturing steps for forming light-blocking layers according to the present invention.
Figure 1B:
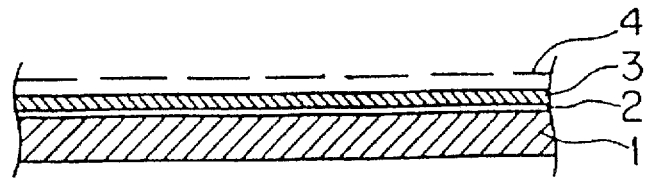
Figure 1C:
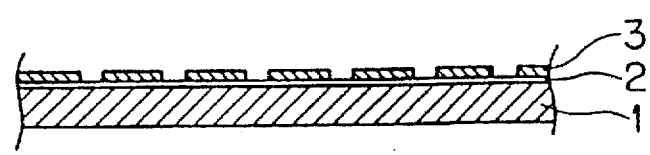
Figure 1D:
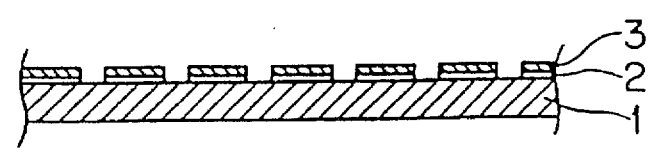
Figure 1E:
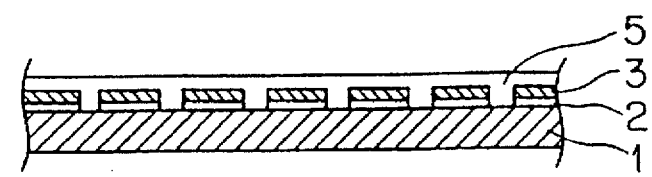
Figure 1F:
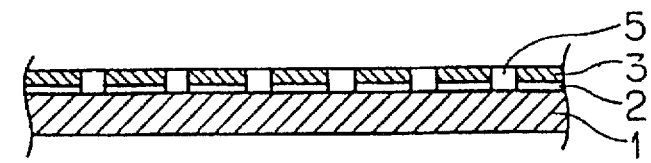
Figure 1G:
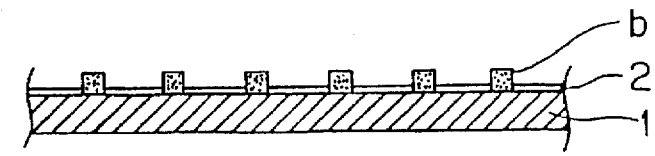
Figure 2:
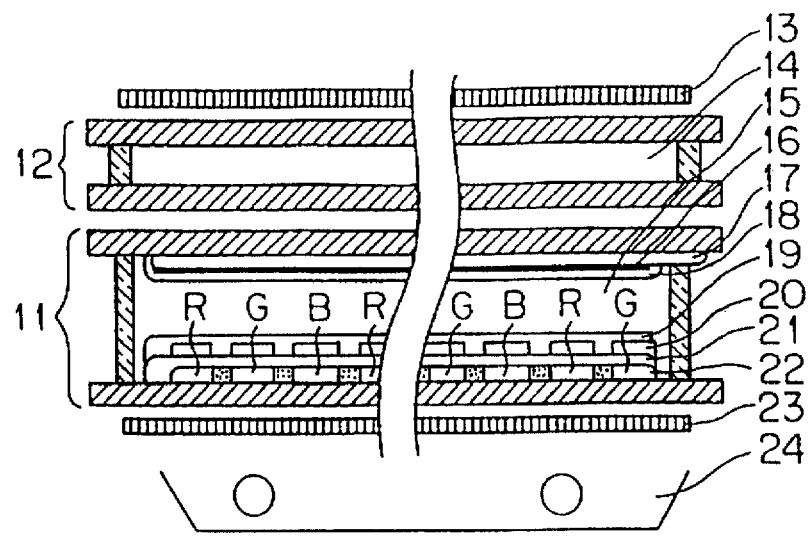
FIG. 2 is a sectional view of a liquid crystal display device according to the invention.
Figure 3:
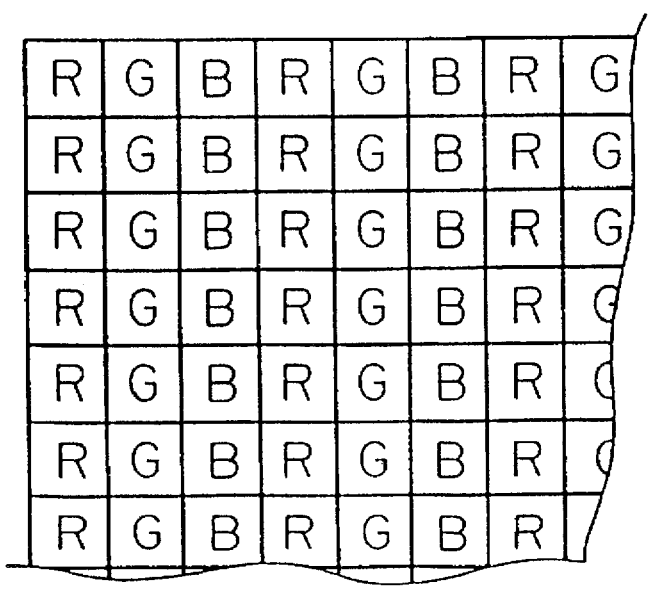
FIG. 3 shows an example of a color display pattern.

[Description of symbols]
1 ... Substrate
2 ... ITO film
3 ... Positive photosensitive resist
4 ... Mask
5 ... Negative photosensitive resist
11 ... Driving cell
12 ... Correction cell
14 ... Correction liquid crystal
15 ... Driving liquid crystal
16 ... Black stripes as light-blocking layers
17 ... Transparent electrodes as scanning electrodes
20 ... Transparent electrodes as signal electrodes
22 ... Color filters
24 ... Back light
b ... Black stripes as light-block layers
R ... Red
G ... Green
B ... Blue

We claim:

1. A manufacturing method for a matrix color liquid crystal display device comprising the steps of:

forming a transparent conductive film on a first transparent substrate;

patterning the transparent conductive film by coating the transparent conductive film with a colored, positive resist followed by exposure and development;

coating patterned transparent conductive fills with a blackened negative resist;

forming black stripes between the patterned transparent conductive films by subjecting the negative resist to back exposure through the first transparent substrate and then development;

removing the positive resist remaining on the patterned transparent conductive films;

forming color filters and a transparent electrode pattern on a second transparent substrate; and sealing a liquid crystal between the first and second transparent substrates.

2. The manufacturing method according to claim 1, characterized in that the positive resist is not removed immediately after the patterning of the transparent conductive film, but used to assist the formation of the black stripes.

3. The manufacturing method according to claim 1, characterized in that the positive resist remaining on the patterned transparent conductive films is used as filters for the negative resist in order to prevent portions of the negative resist lying on the positive resist from being optically set by back exposure.

* * * * *